Patented Apr. 14, 1925.

1,533,947

UNITED STATES PATENT OFFICE.

ANDREW L. RIKER, OF FAIRFIELD, CONNECTICUT.

CONSTANT-COMPRESSION INTERNAL-COMBUSTION ENGINE.

Application filed April 8, 1921. Serial No. 459,807.

REISSUED

*To all whom it may concern:*

Be it known that I, ANDREW L. RIKER, a citizen of the United States, residing at Fairfield, in the county of Fairfield and State of Connecticut, have invented a new and useful Constant-Compression Internal-Combustion Engine, of which the following is a specification.

This invention relates to variable-speed and variable-load internal-combustion engines, such for example as used on automobiles. The object of the invention is to reduce at will the amount of the intake of the gaseous fuel during the suction-stroke of the piston without a corresponding loss of efficiency.

Automobile engines in general use at the present time are of the so-called four-cycle type; and, as is well known, their operation will involve under condition of wide-open throttle the repeated introduction into the cylinder and withdrawal from the outside supply, namely the free air and the gasoline feed line of the same quantity (volume) of fuel-gas, and the compression thereof to the same pressure. When, however, the engine is throttled down and is not running at the maximum capacity, a a smaller volume than before is withdrawn from the free air and source of gasoline; hence this smaller quantity of fuel-gas fills the cylinder (whose capacity, at the end of the intake-stroke, is constant and unvarying) by being less dense, or under less pressure, than the fuel-gas driven into the same cylinder through wide-open throttle; and consequently the compression stroke does not compress this smaller quantity to the same density as if the full (larger) quantity had been drawn in. And when this less-densely compressed mixture is ignited there results a correspondingly-less increase of pressure, and a corresponding lack of efficiency in the power-stroke. The main object of the present invention is the introduction of the reduced quantity of fuel-gas, when the engine is throttled down, and the compression of this smaller amount of gas to the same high pressure as when running with wide-open throttle.

Viewed from another aspect, when the ordinary engines of today are throttled down, the suction-stroke of the piston draws in less fuel-gas than when running with wide-open throttle; and this means that during the suction-stroke the piston is working against a partial vacuum, resulting in a lower initial pressure within the cylinder at the beginning of the compression stroke, which means a loss of efficiency and power. One object of the present invention, then, is to prevent this lowered initial pressure at low engine-speeds and thereby economize power and fuel.

In still another aspect, it is well known that too lean a gas (that is, too low a proportion of gasolene-vapor mixed with too high a proportion of air) is not inflammable. If during the suction-stroke while running more or less throttled-down, an air-inlet should be opened to prevent the vacuum or partial vacuum aforesaid, then the resultant intake into the cylinder would be a mixture too lean to fire.

A specific object of the present invention, then, is to segregate the reduced amount of fuel-gas drawn in while at the same time drawing in sufficient air segregated from the fuel to give the same initial pressure regardless of the engine-speed, and thereupon compressing both of said segregated bodies to a pressure which substantially is the same at all engine-speeds, so that the efficiency of the motor will not be materially decreased when the engine is consuming less than its maximum capacity of fuel.

Broadly stated, then, the present invention comprises the process of separately introducing, into a variable-speed and variable-load internal-combustion engine, a body of air and a body of fuel-mixture, compressing the two segregated bodies, and igniting the compressed fuel-mixture and thereby causing the compressed air to expand.

The invention further comprises an internal-combustion engine of the character stated having the usual compression-end and a distinct space or pocket communicating with said compression-end, but practically segregated therefrom, with a valve-controlled inlet for admitting air into said compression-end and a valve-controlled exhaust-outlet from said compression-end, with a separate valve-controlled inlet for admitting fuel-mixture into said pocket; together with means for timing the opening of said fuel-inlet valve relative to the opening of said air-inlet valve, to vary the fuel-intake at will. The invention further comprises the various features hereinafter set forth and claimed.

The invention will be best understood by reference to the annexed drawings, which illustrate a preferred embodiment of the new apparatus for carrying out the new process. But it will be understood that these drawings and the ensuing description are given merely for the sake of clearness, and not for the purpose of limiting the invention. In these drawings—

Figure 2:
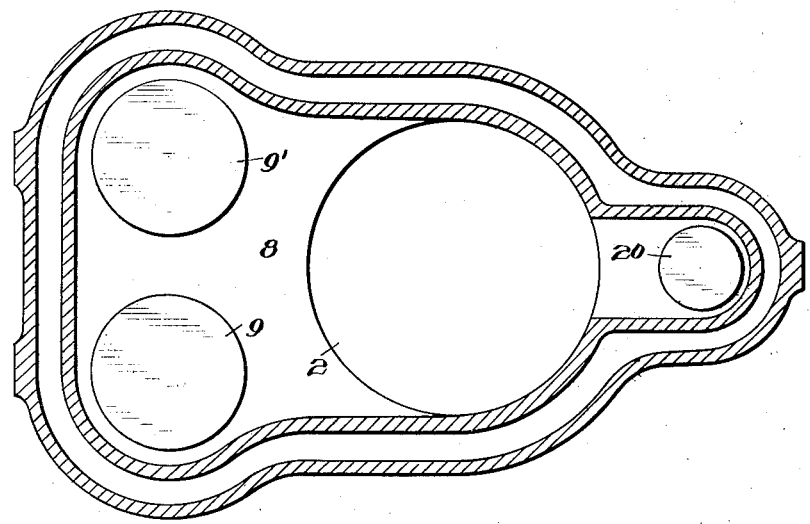
Fig. 2 is a horizontal section through the line II—II of Fig. 1.
Figure 3:
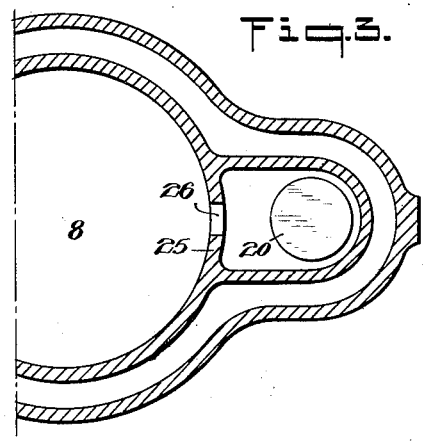
Fig. 3 is a partial horizontal section of a modification.

In these drawings, 1 represents one of the vertical cylinders of the engine, containing the piston 2 with its piston-rod 3 properly connected to the crank 4 of the crank-shaft 5. The cylinder may be enclosed by the usual or any preferred form of water-jacket. 6 is a pipe constituting the inlet for atmospheric air, and 7 a pipe constituting the exhaust, communicating with the valve-controlled cylinder-end or compression-chamber 8 at the top of the cylinder. 9 is the valve for controlling access of air into said cylinder-end or compression-chamber. This valve is shown as provided with a valve-stem 10 passing through a suitable bearing in the engine-frame, and extending through the cam-shaft casing 11 into operative relation with its valve-actuating cam 12 on a suitable shaft 13, which latter is rotated by any suitable connections from the crank-shaft 5. As shown, said valve-stem carries a collar 14 against which bears one end of a coil-spring 15 that encircles said stem, while the other end of said spring bears against the frame, whereby the spring maintains said valve 9 normally in closed position. 9' (see Fig. 2) is a similar valve for controlling the exhaust-outlet through pipe 7. This valve is mounted like valve 9, and is similarly spring-pressed and cam-actuated. 16 represents the usual or any preferred form of carbureter whence a passage 17, preferably having a throttle-valve 18, leads through a suitable opening in the engine-frame into the segregated ignition-chamber 19, which is a pocket located in the upper end of the engine-frame in communication with the compression-chamber. 20 is a valve controlling the entrance of the fuel into said combustion-chamber; and said valve 20 is mounted and actuated, in the manner disclosed for said valve 9, by its own valve-cam 21 (of a form to be described) mounted on a shaft 22 which is rotated in any convenient manner from the crank-shaft 5. Access to said valves 9, 9' and 20 is attained by plugs as 23 and 24, whereof plug 24 is threaded to receive a spark-plug 29 of the usual or any preferred type. Preferably the parts are so proportioned that when the piston 2 is at the top of its stroke there will remain very slight yet sufficient communication between the compression-chamber 8 and the combustion-chamber 19. When the piston is lowered, however, the communication between the two chambers is entirely open (as seen from Fig. 2); but, if preferred, it may be restricted, as shown by Fig. 3, by a partition 25 having a port 26.

Figure 1:
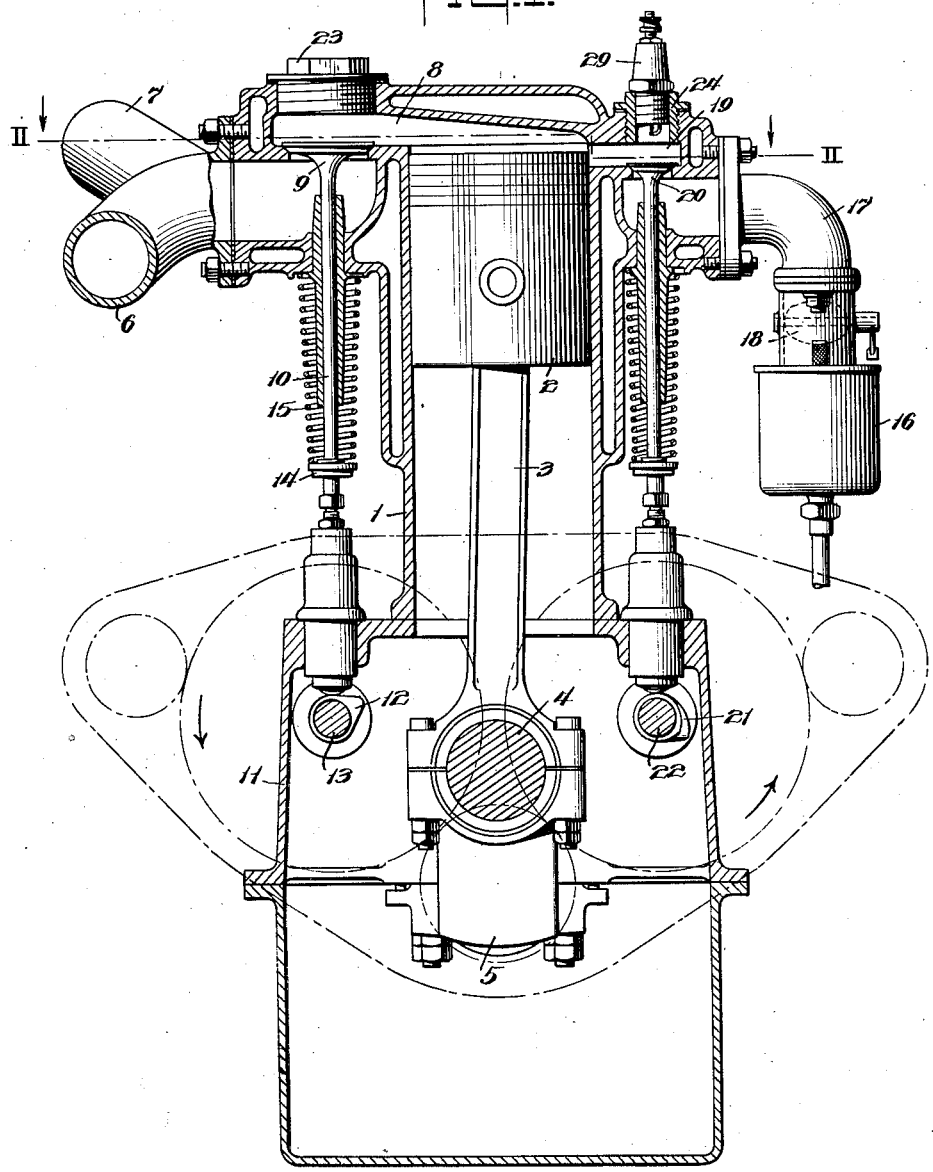
Fig. 1 is a vertical section through a convenient form of four-cycle internal-combustion engine containing a preferred embodiment of the present invention, showing the moving parts in their position at the end of the exhaust-stroke.
Figure 4:
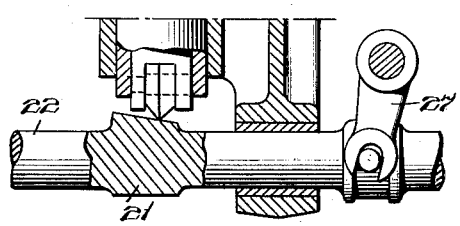
Fig. 4 is a side view, as seen from the left of Fig. 1, of a detail of the structure for actuating the timing-feature of the fuel-intake.
Figure 5:
Fig. 5 is an enlarged front view of the cam for actuating the fuel-inlet valve.

The cam 12 for opening the air-valve 9 and the cam for opening the exhaust-valve 9' may be of the usual or any preferred form. But the cam 21 for opening the fuel-valve 20 is, as indicated by Figs. 4 and 5 of a peculiar form, which might best be described as of a staggered and somewhat conical (or ovoid) shape; that is, said cam is elongated, and at its smaller end the bulge or cam projection is of the minimum height and circumferential extent, which bulge increases in circumferential extent and in height towards the maximum at the larger end. The cam-shaft 22, which carries said staggered-ovoid cam 21, is itself longitudinally movable, as indicated in Fig. 4, to bring a more-extended or a less-extended portion of the cam (as desired) into operative relation with the piston-rod of said valve 20. Such movement of said shaft 22 may be attained by means of a rocker 27 having a forked end engaging a collar on the shaft, said rocker being actuated at will by the operator, preferably by being connected to the usual accelerator-lever. By drawing said cam-shaft and its cam 21 forward (with respect to Fig. 1,—or to the right, with respect to Fig. 4), the cam-action will be advanced, and the valve 20 lifted at an earlier stage and to a greater extent; whereas, by forcing said shaft 22 backwards (to the left, in Fig. 4), the cam-action will be retarded, and the valve 20 lifted at a later stage and to a less extent. Manipulation of the shaft 22 as by the accelerator "times" the admission of fuel to the combustion-chamber.

The operation of the new engine will now be obvious. Upon the intake or suction-stroke of the piston, the exhaust-valve 9' being held down, the air-valve 9 is opened by its cam 12 (against the spring 15) and cold air alone is drawn into the compression-end or chamber 8 of the cylinder, the combustion-chamber or pocket being in free communication with the cylinder; the valve 20 will be opened by its cam 21, either simultaneously with the opening of valve 9 or at a later stage of the same suction-stroke, according to the position into which the shaft 22 has been shifted; and when said valve is opened, the rich mixture from the carbureter will be drawn into the pocket or combustion-chamber. When the fuel intake is retarded, some of the cold air will enter and remain in said chamber 19, and some of the fuel mixture will find its way into the main compression-chamber 8; but practically the fuel-mixture will remain segregated within the combustion-chamber 19. Upon the compression-stroke, the exhaust-valve 9' remaining closed, the cam 12 having already passed by the valve-rod and valve 9 been closed by its spring 15, and the valve 20 being likewise closed by its spring, the contents of the cylinder (consisting mainly of air alone) will be compressed within the chamber 8, and the contents of the communicating-chamber or pocket 19 (consisting mainly of the rich fuel-mixture alone) will likewise be compressed by the pressure imparted by the compressed air. The fuel-mixture within said chamber 19 will be ignited in the usual manner by means of the spark-plug 29, at a less or greater interval before the piston has attained the end of its up-stroke. Upon said ignition, the resultant combustion of the fuel-mixture within chamber 19 produces both heat and also expansive-action, which latter vents itself into chamber 8, while the attendant heat is imparted along with it (and also through the adjacent walls of the structure) to the body of compressed air within chamber 8; and these two added factors expand the contents of chamber 8 and cause the piston to descend in its power-stroke. Following the power-stroke, the exhaust-valve 9' is lifted by its cam to permit the exhaust-stroke of the piston.

To operate the engine under conditions of wide-open throttle, the cam shaft 22 will be so shifted that it will open its valve 20 simultaneously with the opening of valve 9, whereby the fuel-mixture and the cold air are drawn in simultaneously, to be compressed together and to operate upon ignition in the usual manner. But upon retardation of the admission of the fuel mixture, the indrawn body of air and the indrawn body of the mixture will remain practically segregated during the compression, to operate as hereinbefore set forth.

It will be observed that not only does the present invention economize in fuel, but in addition it reduces carbon-deposit, by reason in the first instance of the intense heat generated within the pocket or ignition-chamber, and in the second instance by reason of the scavenging by the excess of atmospheric air within the main compression-chamber and cylinder. Of course, when the fuel-mixture is admitted simultaneously with the air, without being retarded, the apparatus operates in the present well-known manner.

It will also be observed that owing to the free intake of air through the relatively large valve 9, the initial pressure within the cylinder at the beginning of the compression stroke will be substantially constant irrespective of the speed of the engine.

The invention has thus been described with considerable detail as carried out by and embodied in a specific structure. But it is obvious that the new process can be carried out by other structures, and that the new structure set forth may be modified in numerous details with respect to shape or arrangement, or relative location of parts, without in either case departing from the spirit of the invention. The essentials are: the practical segregation, when desired, of a compressed body of fuel-mixture and a compressed body of atmospheric air, with provision for expanding the compressed air by igniting the compressed fuel-mixture; means for the admission of the air to maintain a substantially constant initial-pressure at all engine-speeds and separate means for the admission of the fuel-mixture; means such as a pocket adjacent the compressed-air space in the top of the cylinder for segregating and compressing the fuel-mixture in close juxtaposition to the compressed-air; and means whereby the admission of the mixture can be timed in relation to the admission of the air.

The invention having been thus fully described, what is claimed is:

1. An internal-combustion engine, comprising a cylinder affording a compression-end and provided with a valve-controlled exhaust-outlet, a piston reciprocable within said cylinder, a separate ignition-pocket provided with suitable ignition-means and having a valve-controlled inlet for admitting fuel-mixture, a valve-controlled cold-air inlet leading into one side of said compression-end, and a restricted port leading from said pocket into said compression-end at the side diametrically opposite to said cold-air inlet.

2. An internal-combustion engine, comprising a cylinder affording a compression-end and provided with a valve-controlled exhaust-outlet, a piston reciprocable within said cylinder, a separate ignition-pocket provided with suitable ignition-means and having a valve-controlled inlet for admitting fuel-mixture, a valve-controlled cold-air inlet leading into one side of said compression-end, a restricted port leading from said pocket into said compression-end at the side diametrically opposite to said cold-air inlet, and means for timing the occurrence and duration of the admissions of fuel-mixture with respect to the intakes of cold-air.

3. An internal-combustion engine, comprising a cylinder having a valve-controlled cold-air inlet and a valve-controlled exhaust-outlet, a piston reciprocable within said cylinder, a separate ignition-pocket provided with suitable ignition-means and having a valve-controlled inlet for admitting fuel-mixture, a restricted port leading from said pocket into the compression-end of said cylinder at a point diametrically opposite to said cold-air inlet, means for maintaining uniform and uniformly-spaced intakes of cold air alternating with regularly-occurring exhausts, and means for timing at will with respect to said intakes of cold air the occurrence and duration of the intakes of fuel-mixture.

ANDREW L. RIKER.